United States Patent
Nagasaka

(10) Patent No.: US 10,650,832 B2
(45) Date of Patent: May 12, 2020

(54) INFORMATION PROCESSING DEVICE AND INFORMATION PROCESSING METHOD

(71) Applicant: SONY CORPORATION, Tokyo (JP)

(72) Inventor: Hideo Nagasaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/080,131

(22) PCT Filed: Nov. 28, 2016

(86) PCT No.: PCT/JP2016/085247
§ 371 (c)(1),
(2) Date: Aug. 27, 2018

(87) PCT Pub. No.: WO2017/154283
PCT Pub. Date: Sep. 14, 2017

(65) Prior Publication Data
US 2019/0051308 A1    Feb. 14, 2019

(30) Foreign Application Priority Data

Mar. 7, 2016   (JP) .................................. 2016-042974

(51) Int. Cl.
*G10L 21/00* (2013.01)
*G10L 17/26* (2013.01)
(Continued)

(52) U.S. Cl.
CPC .............. *G10L 17/26* (2013.01); *G06Q 10/10* (2013.01); *G06Q 10/20* (2013.01);
(Continued)

(58) Field of Classification Search
None
See application file for complete search history.

(56) References Cited

U.S. PATENT DOCUMENTS 7,574,661 B2 * 8/2009 Matsuura ............... G06Q 10/10
715/745
2012/0295575 A1 * 11/2012 Nam .................... G08B 25/016
455/404.1
(Continued)

FOREIGN PATENT DOCUMENTS

CN        103329179 A      9/2013
JP        2009-005075 A    1/2009
(Continued)

OTHER PUBLICATIONS

International Search Report and Written Opinion of PCT Application No. PCT/JP2016/085247, dated Feb. 14, 2017, 09 pages of ISRWO.

*Primary Examiner* — Satwant K Singh
(74) *Attorney, Agent, or Firm* — Chip Law Group

(57) ABSTRACT

An information processing device including a connection control unit that, in a case where information regarding a situation of a user is detected, controls connection to another information processing device by using identification information corresponding to the situation of the user, an output control unit configured to control output of acquisition information acquired from the other information processing device, while the information processing device is connected to the other information processing device, and a transmission control unit configured to control transmission of input information input by the user, to the other information processing device, while the information processing device is connected to the other information processing device. In a case where a predetermined condition is satisfied, the connection control unit invalidates the identification information.

20 Claims, 9 Drawing Sheets

(51) Int. Cl.
  *G06Q 10/00* (2012.01)
  *G06Q 30/06* (2012.01)
  *G06Q 10/10* (2012.01)
  *G06Q 50/16* (2012.01)
  *G10L 25/78* (2013.01)
  *G10L 15/26* (2006.01)

(52) U.S. Cl.
  CPC ......... *G06Q 30/0611* (2013.01); *G06Q 50/16* (2013.01); *G10L 25/78* (2013.01); *G10L 15/26* (2013.01)

(56) References Cited

U.S. PATENT DOCUMENTS

| | | |
|---|---|---|
| 2015/0245391 A1 | 8/2015 | Matsuyama et al. |
| 2017/0124338 A1* | 5/2017 | Oonishi ................. G06F 21/602 |
| 2019/0095867 A1* | 3/2019 | Nishijima ............... G10L 17/26 |

FOREIGN PATENT DOCUMENTS

| | | |
|---|---|---|
| JP | 2011-108197 A | 6/2011 |
| JP | 2013-518501 A | 5/2013 |
| JP | 2015-162783 A | 9/2015 |
| KR | 10-2011-0086911 A | 8/2011 |
| WO | 2011/090360 A2 | 7/2011 |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/085247 filed on Nov. 28, 2016, which claims priority benefit of Japanese Patent Application No. JP 2016-042974 filed in the Japan Patent Office on Mar. 7, 2016. Each of the above-referenced applications is hereby incorporated herein by reference in its entirety.

TECHNICAL FIELD

The present disclosure relates to an information processing device, an information processing method, and a program.

BACKGROUND ART

In recent years, various systems are known as systems for changing a situation of a user. For example, there is disclosed a technology in which an intermediary that mediates between a user and an answerer provides a question of the user to a plurality of answerers, selects an appropriate answer proposal from among answer proposals obtained from the plurality of respective answerers, and makes an answer to the user on the basis of the selected answer proposal (e.g. refer to Patent Literature 1).

In addition, there is disclosed a technology in which an intermediate center searches answers pre-registered in a database, on the basis of a question of a user, and generates an answerer list on the basis of the question of the user in a case where an answer is not obtained from the database (e.g. refer to Patent Literature 2). In this technology, an answerer with a higher degree of matching to the question of the user is positioned at a higher place in the answerer list, and answerers receive the question of the user in order from the answerer positioned at the higher place in the answerer list.

CITATION LIST

Patent Literature

Patent Literature 1: JP 2002-74064 A
Patent Literature 2: JP 2004-192521 A

DISCLOSURE OF INVENTION

Technical Problem

Nevertheless, in some cases, the user is assumed to consider that he or she desires to directly make contact with an answerer. At this time, when devices of the user and an answerer are once connected using identification information, the answerer possibly tries to make contact with the user using the identification information, despite the intention of the user, even after the connection has ended. Thus, the user sometimes considers that he or she does not want to directly make contact with the answerer. In view of the foregoing, a technology that enables the user to easily make direct contact with an answerer is desired to be provided.

Solution to Problem

According to the present disclosure, there is provided an information processing device including: a connection control unit configured, in a case where information regarding a situation of a user is detected, to control connection to another information processing device by using identification information corresponding to the situation of the user; an output control unit configured to control output of acquisition information acquired from the other information processing device, while the information processing device is connected to the other information processing device; and a transmission control unit configured to control transmission of input information input by the user, to the other information processing device, while the information processing device is connected to the other information processing device. In a case where a predetermined condition is satisfied, the connection control unit invalidates the identification information.

According to the present disclosure, there is provided an information processing method including: controlling connection to another information processing device by using identification information corresponding to a situation of a user, in a case where information regarding the situation of the user is detected; controlling output of acquisition information acquired from the other information processing device, while being connected to the other information processing device; and controlling transmission of input information input by the user, to the other information processing device, while being connected to the other information processing device. In a case where a predetermined condition is satisfied, the identification information is invalidated by a processor.

According to the present disclosure, there is provided a program for causing a computer to function as an information processing device including: a connection control unit configured, in a case where information regarding a situation of a user is detected, to control connection to another information processing device by using identification information corresponding to the situation of the user; an output control unit configured to control output of acquisition information acquired from the other information processing device, while the information processing device is connected to the other information processing device; and a transmission control unit configured to control transmission of input information input by the user, to the other information processing device, while the information processing device is connected to the other information processing device. In a case where a predetermined condition is satisfied, the connection control unit invalidates the identification information.

Advantageous Effects of Invention

As described above, according to the present disclosure, a technology that enables the user to easily make direct contact with an answerer is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
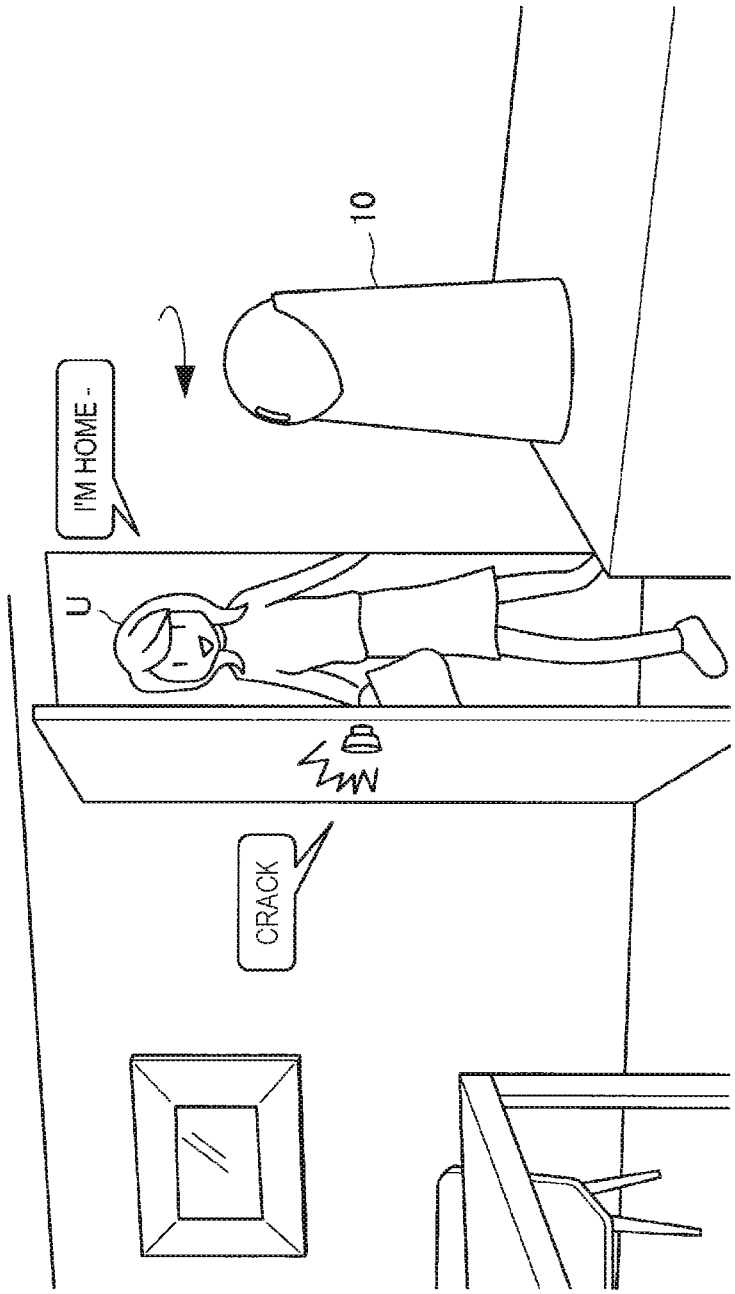
FIG. 1 is a diagram illustrating an overview of an information processing device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in the present specification and the drawings, structural elements that have substantially the same function and structure are sometimes distinguished from each other using different numbers after the same reference sign. However, when there is no need in particular to distinguish structural elements that have substantially the same function and structure, the same reference sign alone is attached.

Note that, the description is given in the following order.
1. Embodiment of present disclosure
1.1 Overview
1.2. Functional configuration example
1.3. Details of functions
1.4. Hardware configuration example
2. Conclusion

1. Embodiment of Present Disclosure

[1.1 Overview]

First, with reference to drawings, an overview of an information processing device according to an embodiment of the present disclosure will be described. FIG. 1 is a diagram illustrating the overview of the information processing device according to the embodiment of the present disclosure. As illustrated in FIG. 1, an information processing device 10 and a user U are in the embodiment of the present disclosure.

Note that, in the present specification, it is mainly assumed that the information processing device 10 functions as an agent. Here, the agent is a device configured to autonomously determine intention of the user U by interpreting input information of the user U, and control execution of a process based on the intention of the user U. In the present specification, it is assumed that the information processing device 10 is a robot, and sometimes the information processing device 10 is referred to as the agent.

There are various kinds of input information of the user U. For example, the input information includes information regarding a situation of the user U. In the present specification, the description will be given using a problem that the user U has (in the example illustrated in FIG. 1, such a problem that "a door has broken down"), as an example of information regarding the situation of the user U. For example, the information regarding the situation of the user U may include information regarding failures of goods or facilities. However, the information regarding the situation of the user U is not limited to the problem that the user U has. For example, the information regarding the situation of the user U may be a demand from the user U or may be a question from the user U. Alternatively, the information regarding the situation of the user U may be other information regarding the situation of the user U.

First of all, for solving a problem that the user U has, the information processing device 10 needs to detect the problem that the user U has. For example, in a case where the user U inputs, by gesture, a problem that the user U has, the problem that the user U has can be detected by an image recognition process performed on a captured image. In addition, in a case where the user U inputs, using the position of itself, a problem that the user U has, the problem that the user U has, the problem that the user U has can be detected by a distance between the information processing device 10 and the user U. In addition, in a case where the user U inputs, using voice, a problem that the user U has, the problem that the user U has, the problem that the user U has can be detected by a speech recognition process performed on collected sound information.

Note that, an operation performed by the information processing device 10 on input information input by the user U may be decided in any manner. As an example, input information input by the user U and an operation performed by the information processing device 10 may be associated with each other in advance, and registered in a database. In this case, the information processing device 10 is only required to acquire, from the database, an operation corresponding to input information input by the user U (e.g. an operation corresponding to or similar to the input information input by the user U). An operation performed by the information processing device 10 is not specifically limited. Assumed examples of the operation include output of output information corresponding to input information, transmission of a problem that the user U has, display of a site corresponding to input information, control of a process of making a call to other party corresponding to input information, and the like.

In addition, the information processing device 10 can identify the type of a problem by the analysis of the detected problem. For example, if the type of the problem is parts shortage, the information processing device 10 can cause the user U to browse a parts purchase site, or control a process of making a call to a parts sales company. In addition, if the type of the problem is failure of goods, the information processing device 10 can cause the user U to browse a site of a repair company of the goods, or control a process of making a call to a repair company of the goods.

Alternatively, an operation to be performed by the information processing device 10 may be narrowed down by a conversation (dialogue) performed between the information processing device 10 and the user U. For example, a conversation performed between the information processing device 10 and the user U for narrowing down an operation to be performed by the information processing device 10 may be patterned in advance. For example, if there is data in which problems that the user U has and sequences for solving the problems are collected, a conversation performed between the information processing device 10 and the user U for narrowing down an operation to be performed by the information processing device 10 can be patterned by the analysis of the data.

With reference to FIG. 1, the overview of the information processing device 10 has been described.

[1.2. Functional Configuration Example]

Figure 2:
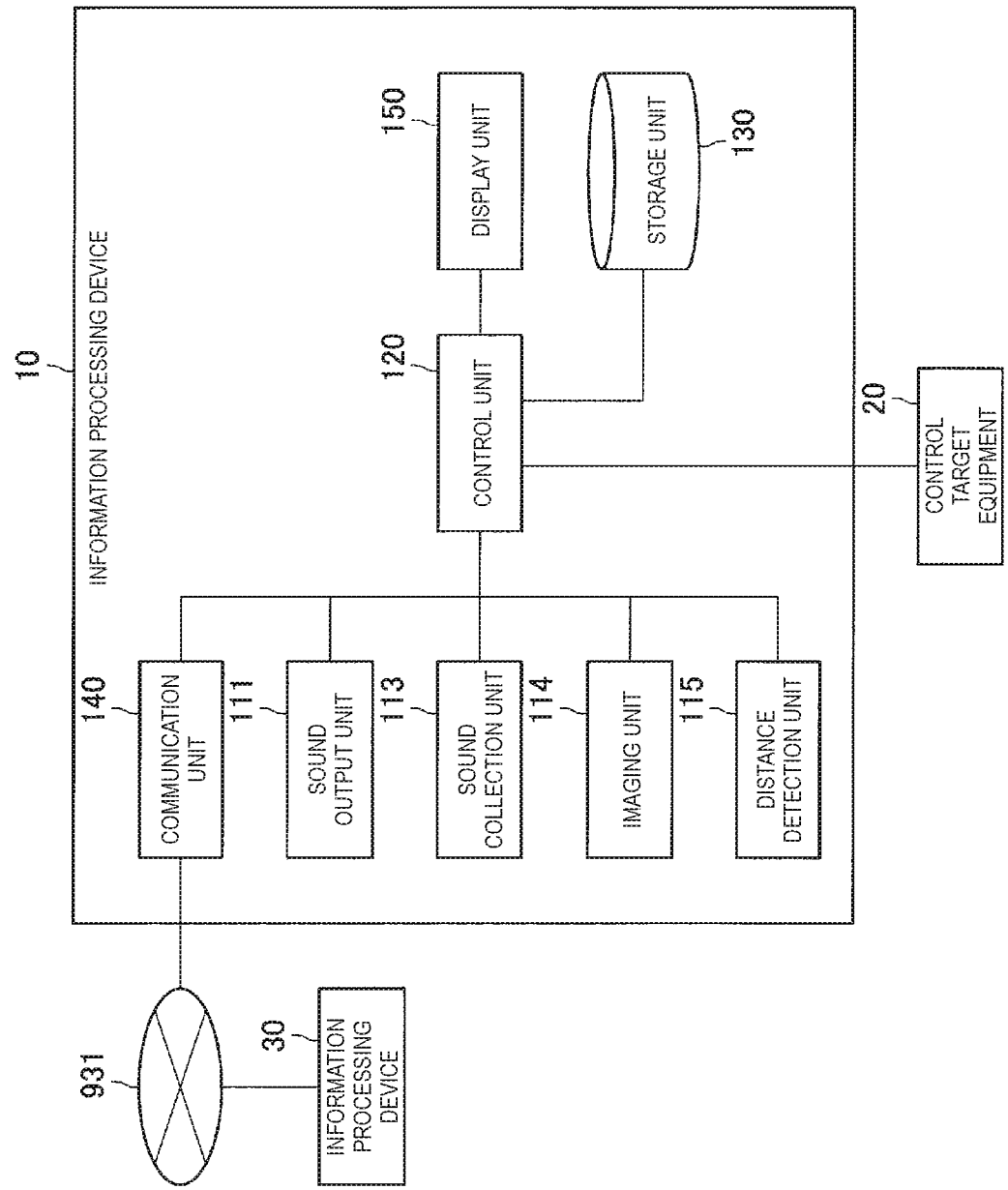
FIG. 2 is a diagram illustrating a functional configuration example of the information processing device.

Next, a functional configuration example of the information processing device 10 will be described. FIG. 2 is a diagram illustrating the functional configuration example of the information processing device 10. As illustrated in FIG. 2, the information processing device 10 includes a sound output unit 111, a sound collection unit 113, an imaging unit 114, a distance detection unit 115, a control unit 120, a storage unit 130, a communication unit 140, and a display unit 150. The information processing device 10 and control target equipment 20 are capable of communicating with each other via a network (such as a wireless local area network (LAN)). In addition, the information processing device 10 is connected with a communication network 931, and can communicate with an information processing device 30 via the communication network 931. For example, the communication network 931 is implemented by the Internet.

The control target equipment 20 is equipment capable of accepting a command from the information processing device 10 and executing the command. Here, the type of the control target equipment 20 is not specifically limited. For example, the control target equipment 20 may be a telephone. In addition, as illustrated in FIG. 2, the control target equipment 20 may include a storage unit 230. The storage unit 230 may be implemented by, for example, a magnetic storage device, a semiconductor storage device, an optical storage device, or a magneto-optical storage device.

The sound output unit 111 has a function of outputting sound. For example, the sound output unit 111 includes a speaker. The sound is output through the speaker. The number of speakers included in the sound output unit 111 is not specifically limited as long as the number of speakers is one or more. In addition, positions of the one or more speakers included in the sound output unit 111 are not specifically limited. Note that, the sound output unit 111 may include a sound output device other than the speaker (such as earphones or headset) as long as the device has a sound outputting function.

The sound collection unit 113 has a function of acquiring sound through sound collection. For example, the sound collection unit 113 includes a microphone, and the sound is collected through the microphone. The number of microphones included in the sound collection unit 113 is not specifically limited as long as the number of microphones is one or more. In addition, positions of the one or more microphones included in the sound collection unit 113 are not specifically limited. Note that, the sound collection unit 113 may include a sound collection device other than the microphone as long as the device has a sound information collection function.

The imaging unit 114 has a function of inputting an image through image capturing. For example, the imaging unit 114 includes a camera, and an image captured by the camera is input. The number of cameras included in the imaging unit 114 is not specifically limited as long as the number of cameras is one or more. In addition, positions of the one or more cameras included in the imaging unit 114 are not specifically limited. In addition, the one or more cameras may include a monocular camera, or may include a stereo camera.

The distance detection unit 115 has a function of detecting a distance to a user U. For example, the distance detection unit 115 includes a ranging sensor, and acquires a distance to a user U detected by the ranging sensor. A position of the ranging sensor is not specifically limited. In addition, the type of the ranging sensor is not specifically limited. For example, the distance sensor may be an infrared distance sensor or may be an ultrasonic distance sensor.

The communication unit 140 has functions of acquiring data from the information processing device 30 connected with the communication network 931 and writing data to the information processing device 30 via the communication network 931. For example, the communication unit 140 is implemented by a communication interface. Note that, the number of the information processing devices 30 connected with the communication network 931 may be one or more.

The storage unit 130 is a storage medium configured to store programs to be executed by the control unit 120 and store data necessary for executing the programs. In addition, the storage unit 130 temporarily stores data for computation to be performed by the control unit 120. The storage unit 130 may be implemented by a magnetic storage unit device, a semiconductor storage device, an optical storage device, a magneto-optical storage device, or the like.

The display unit 150 has a function of displaying various kinds of screens. In this embodiment, it is mainly assumed that the display unit 150 is a projector. However, the type of the display unit 150 is not limited. For example, the display unit 150 may be a liquid crystal display or an organic electro-luminescence (EL) display as long as the display unit 150 is a display capable of displaying screens that are visible by users. In addition, in this embodiment, it is assumed that the display unit 150 displays a screen at a relatively high position (such as a wall) or at a relatively low position (such as a body of the agent or a place near hands of a user). However, the position at which the display unit 150 displays a screen is not limited.

Figure 3:
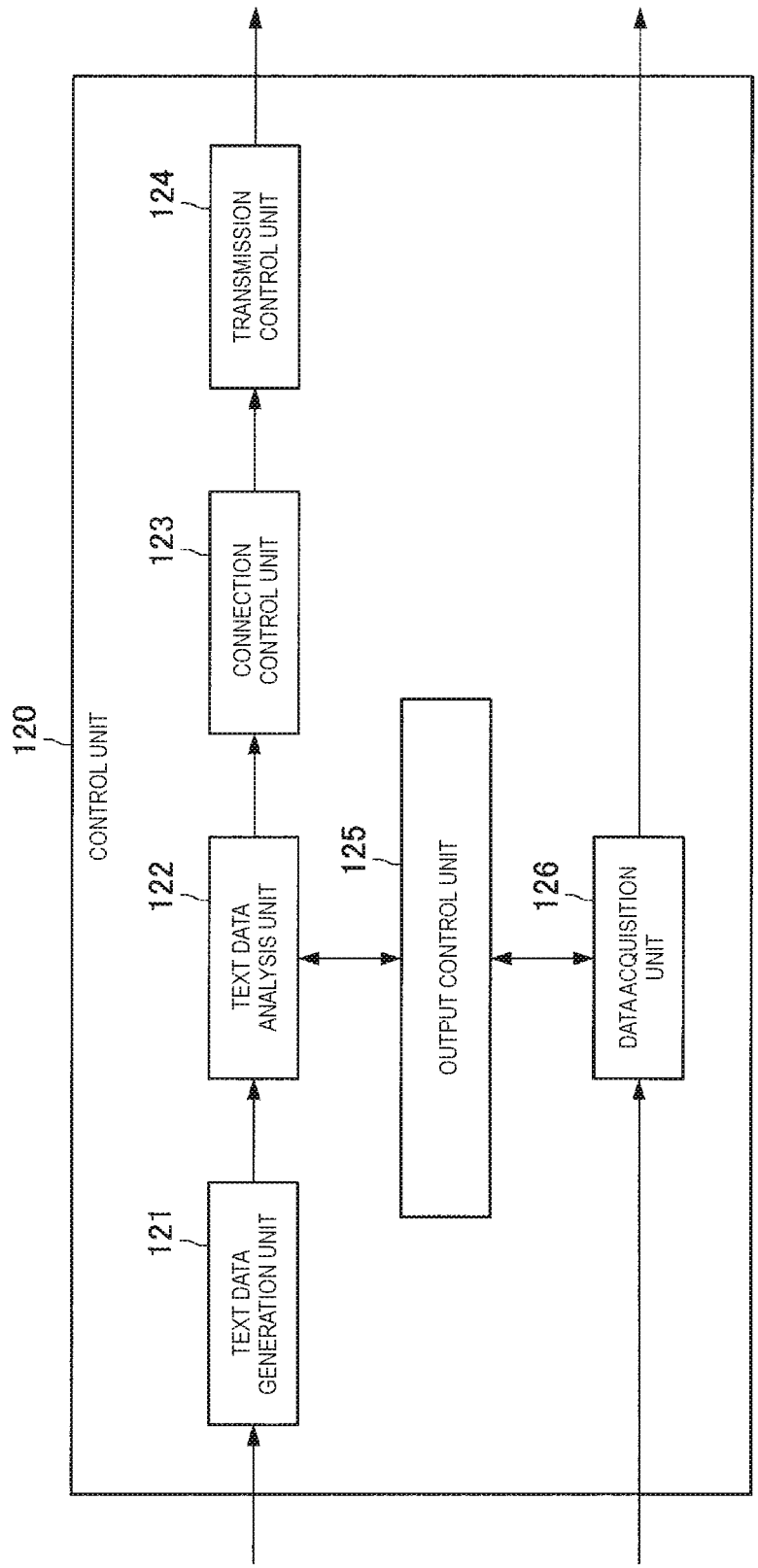
FIG. 3 is a diagram illustrating a detailed configuration example of a control unit.

The control unit 120 controls the respective units in the information processing device 10. FIG. 3 is a diagram illustrating a detailed configuration example of the control unit 120. As illustrated in FIG. 3, the control unit 120 includes a text data generation unit 121, a text data analysis unit 122, a connection control unit 123, a transmission control unit 124, an output control unit 125, and a data acquisition unit 126. Details of these functional blocks will be described later. Note that, for example, the control unit 120 may be implemented by a central processing unit (CPU) or the like. In the case where the control unit 120 is implemented by a processing device such as the CPU, the processing device may be implemented by an electronic circuit.

Note that, hereinafter, the wording "voice" (or "speech") and the wording "sound" are used differently. Specifically, with regard to sound collected by the sound collection unit 113, the "voice" and the "speech" mainly mean speech from a user U. In addition, the wording "voice" (or "speech") mainly means speech performed by the information processing device 10, among sounds output from the information processing device 10. The wording "sound" includes a sound emitted from an object, and the like, aside from the speech from the user U and the speech performed by the information processing device 10.

The functional configuration example of the information processing device 10 according to the embodiment has been described above.

[1.3. Details of Functions]

Subsequently, the details of functions of the information processing device 10 will be described. In the following description, the information processing device 30 is assumed to be a terminal used by an answerer of a repair company. Nevertheless, the information processing device 30 needs not be a terminal used by an answerer of a repair company. For example, the information processing device 30 can be used by any person that can make an answer to a problem that the user U has. In addition, in the following description, it is assumed that an answerer of a repair company makes an answer to a problem that the user U has, that is to say, such a problem that "a door of a house has broken down".

Figure 4:
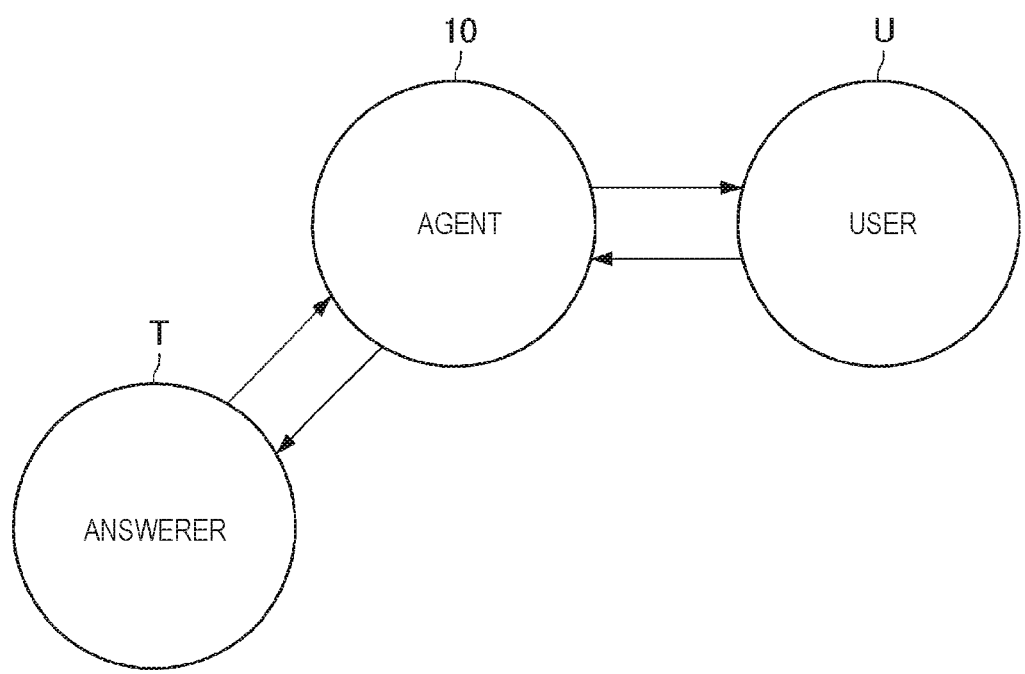
FIG. 4 is a diagram illustrating an example of a relationship between a user, the information processing device, and an answerer.

FIG. 4 is a diagram illustrating an example of a relationship between the user U, the agent (information processing device) 10, and an answerer T. As illustrated in FIG. 4, the user U communicates with the agent 10. Then, in a case where the agent 10 detects a problem that the user U has, if the agent 10 can generate an answer to the problem by itself, the agent 10 returns the answer generated by itself, to the user U. On the other hand, in a case where the agent 10 detects a problem that the user U has, if the agent 10 cannot generate an answer to the problem by itself, the agent 10 transmits the problem to the information processing device 30 used by the answerer T.

Here, in some cases, the user U is assumed to consider that he or she desires to directly make contact with the answerer T. At this time, when the information processing device 10 and the information processing device 30 are once connected using identification information, the answerer T possibly tries to make contact with the user U using the identification information, despite the intention of the user U, even after the connection has ended. Thus, the user U sometimes considers that he or she does not want to directly make contact with the answerer. In the following description, a technology that enables the user U to easily make direct contact with the answerer T is mainly proposed. Note that, answers may include information for improving a problem that the user U has (situation of the user U).

Figure 5:
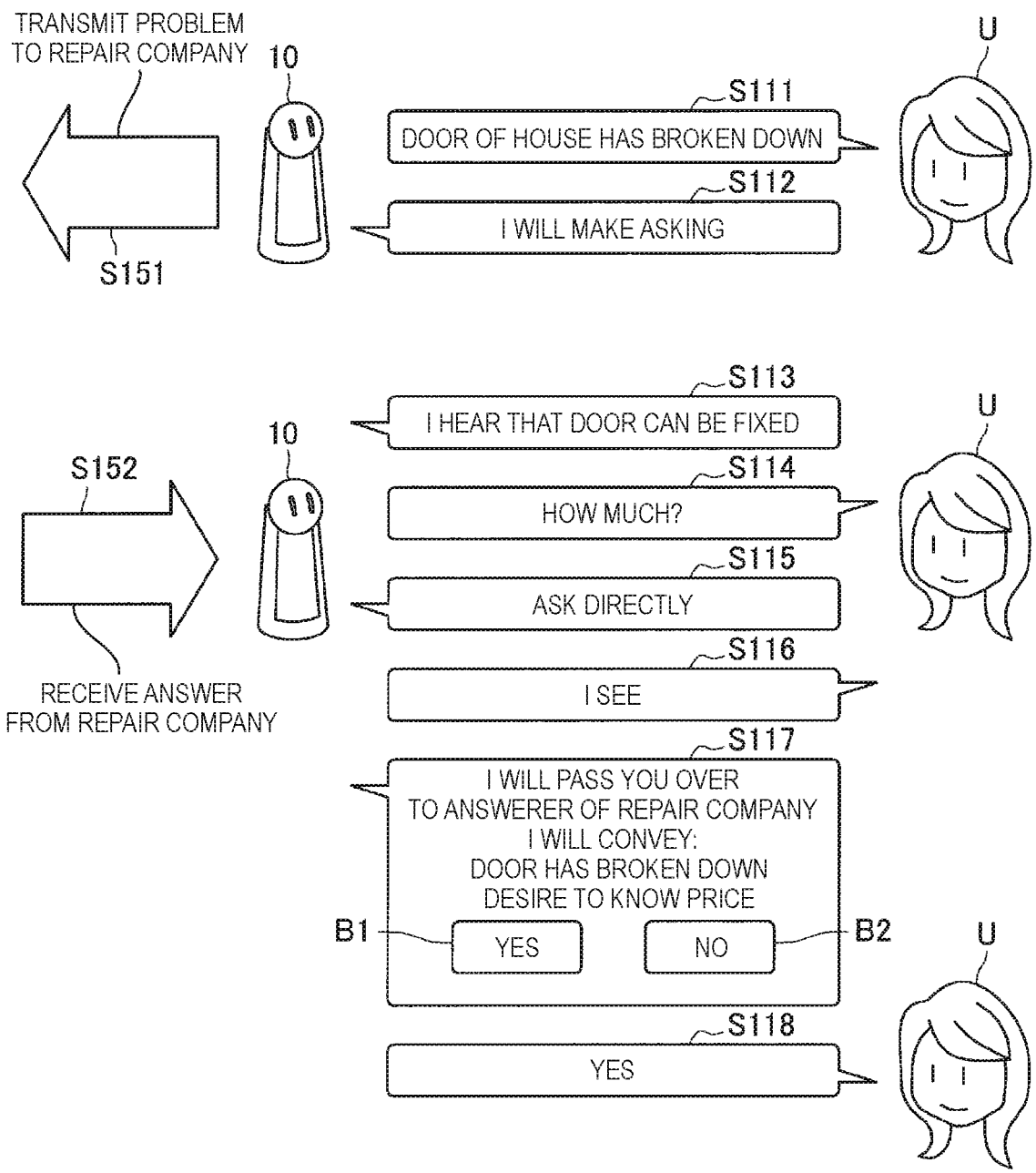
FIG. 5 is a diagram illustrating an example of a flow of a conversation performed between the information processing device and the user.
Figure 6:
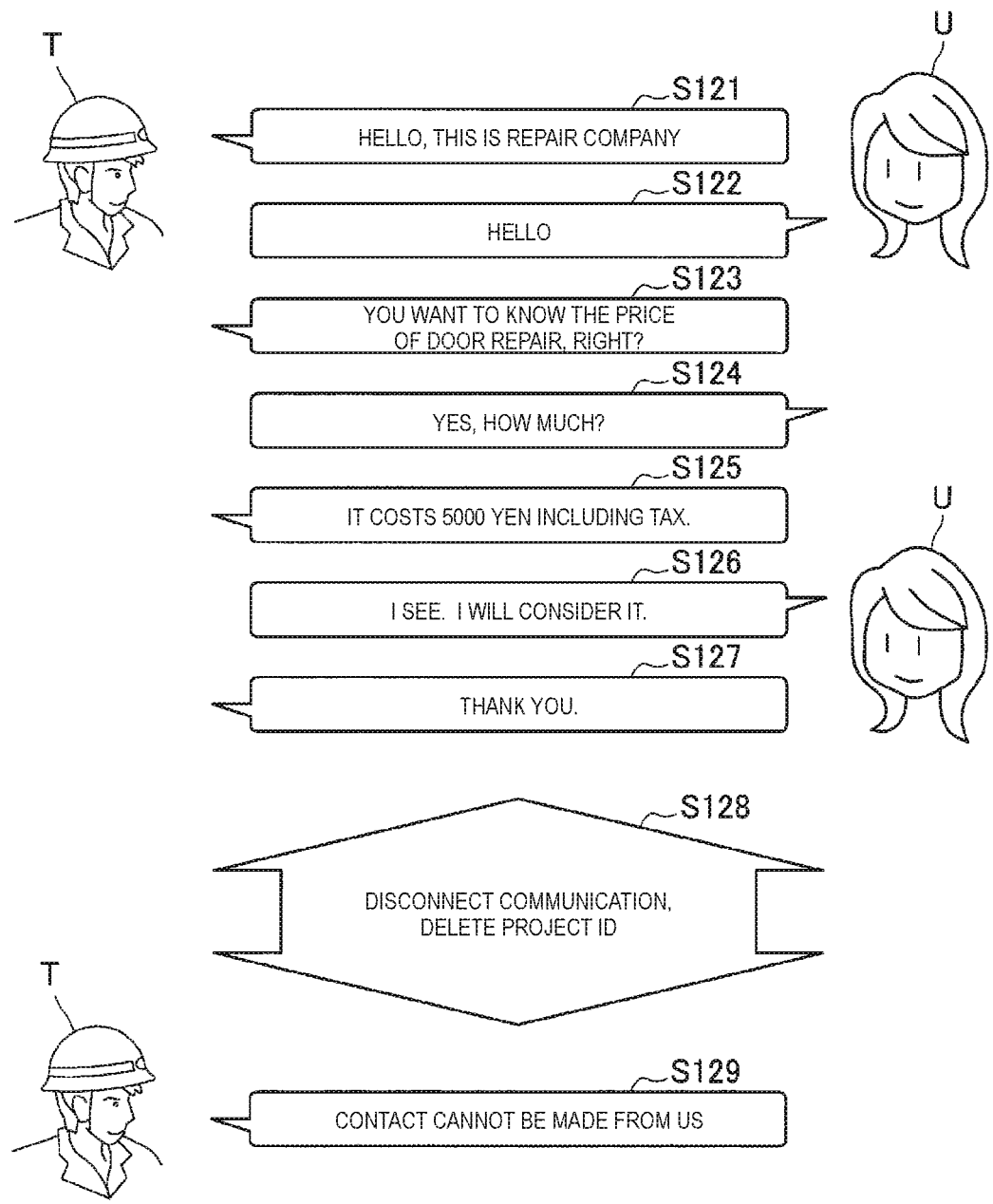
FIG. 6 is a diagram illustrating an example of a flow of a conversation performed between the user and the answerer.
Figure 7:
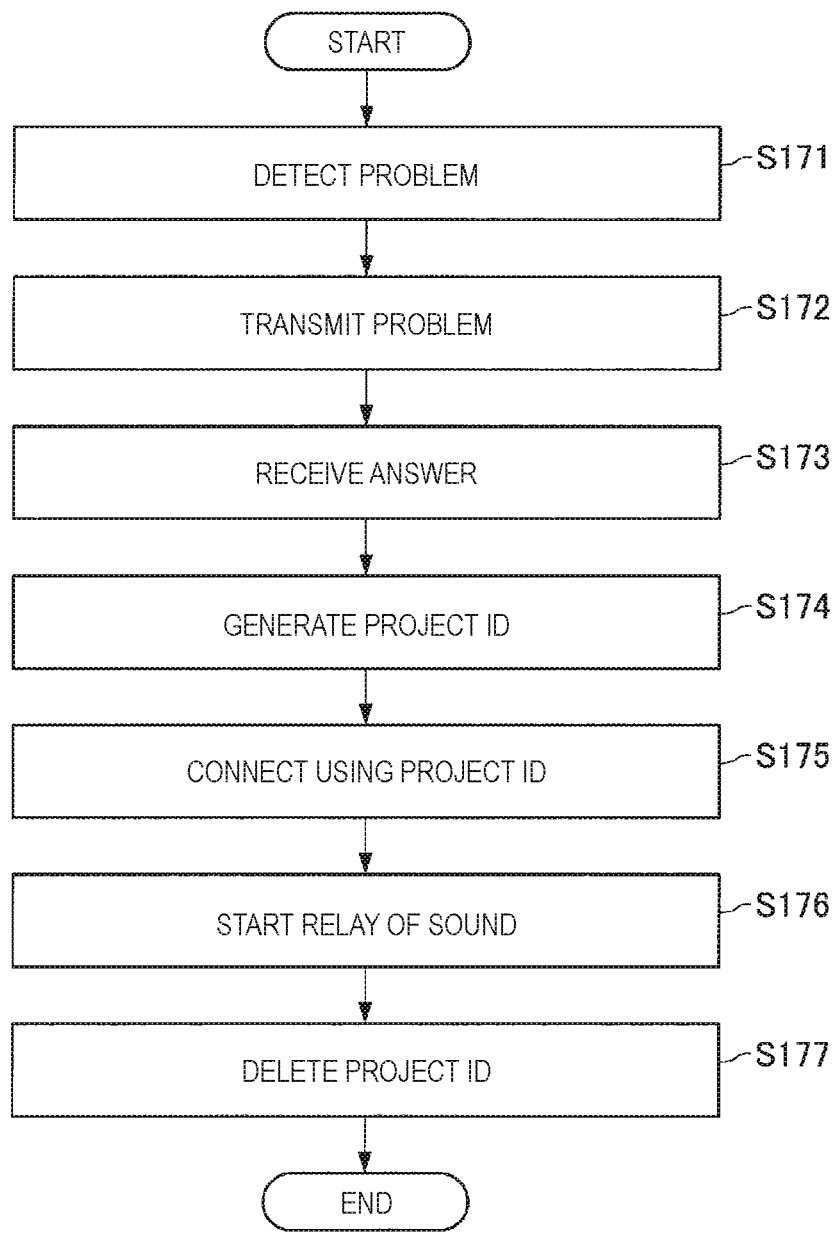
FIG. 7 is a flow chart illustrating an example of a flow of an operation of the information processing device.

FIG. 5 is a diagram illustrating an example of a flow of a conversation performed between the information processing device 10 and the user U. In addition, FIG. 6 is a diagram illustrating an example of a flow of a conversation performed between the user U and the answerer T. In addition, FIG. 7 is a flow chart illustrating an example of a flow of an operation of the information processing device 10. As illustrated in FIG. 5, a conversation can be performed between the information processing device 10 and the user U. The conversation performed between the information processing device 10 and the user U starts to be recorded on the storage unit 130 as conversation information.

More specifically, the conversation information may include first text data (content of speech performed by the user U) obtained by a speech recognition process performed by the text data generation unit 121 that is based on sound information collected by the sound collection unit 113. In addition, the conversation information may include second text data (content of speech performed by the information processing device 10) provided to the user U in accordance with an analysis result of the first text data (e.g. second text data registered in a database with being associated with the first text data in advance).

Here, the speech recognition process performed by the text data generation unit 121 may be directly performed on the sound information collected by the sound collection unit 113, or may be performed on sound information obtainable after a process of some sort (e.g. noise reduction, etc.) is performed on the sound information collected by the sound collection unit 113.

Note that, in the present specification, it is mainly assumed that a conversation between the user U and the information processing device 10 is performed using voice. Nevertheless, a conversation between the user U and the information processing device 10 may be performed using an image. More specifically, a conversation may be performed between the user U and the information processing device 10 using gesture of the user U of which an image is captured by the imaging unit 114, and an image displayed by the display unit 150. Alternatively, a conversation may be performed between the user U and the information processing device 10 using text data input by the user U, and text data displayed by the display unit 150.

When the user U faces such a problem that a door of a house has broken down, the user U emits such voice that "a door of a house has broken down" (S111). In the information processing device 10, the sound collection unit 113 receives the voice as sound information, and the text data generation unit 121 generates text data "a door of a house has broken down" by the speech recognition process that is based on the sound information.

Subsequently, by analyzing the text data "a door of a house has broken down", the text data analysis unit 122 detects the problem that the user U has "a door has broken down" (S171). For example, it is assumed that a combination of a noun "door", a verb "broken down", and a problem "a door has broken down" is pre-registered in a database. In this case, the text data analysis unit 122 is only required to detect the problem that the user U has "a door has broken down", by acquiring the problem "a door has broken down" corresponding to the noun "door" and the verb "broken down" that are included in the generated text data "a door of a house has broken down".

In addition, an operation of the information processing device 10 "output of output information indicating that "I will make asking"" may also be registered in the database in association with the problem "a door has broken down". In other words, the output control unit 125 may control "output of output information indicating that "I will make asking"" corresponding to the sound information "a door of a house has broken down" (S112).

Note that, here, it is assumed that the output information includes voice information (e.g. voice information obtained by reading out text data, etc.), and the output control unit 125 controls the sound output unit 111 such that the voice information is output by the sound output unit 111. Nevertheless, the output information needs not include voice information. For example, the output information may include display information (e.g. character string corresponding to text data, etc.), and the output control unit 125 may control the display unit 150 such that the display information is output by the display unit 150.

Furthermore, an operation of the information processing device 10 "transmission of a problem to a repair company" may also be registered in the database in association with the problem "a door has broken down". More specifically, in a case where the problem that the user U has "a door has broken down" is detected, the transmission control unit 124 controls the transmission of the problem that the user U has "a door has broken down", to the information processing device 30 (S151, S172). Subsequently, in the information processing device 30 used by an answerer of the repair company, the problem that the user U has "a door has broken down" is received. For notifying the user U that the repair company can repair the door, the information processing device 30 transmits, to the information processing device 10, an answer "the door can be fixed" indicating that the problem that the user U has "a door has broken down" can be solved (an answer indicating that the situation of the user U can be changed).

Subsequently, in the information processing device 10, the communication unit 140 receives the answer "the door can be fixed" indicating that the problem that the user U has "a door has broken down" can be solved (S152, S173). Then, the data acquisition unit 126 acquires the answer "the door can be fixed" indicating that the problem that the user U has "a door has broken down" can be solved.

Furthermore, in a case where the answer "the door can be fixed" indicating that the problem that the user U has "a door has broken down" can be solved is acquired by the data acquisition unit 126, the output control unit 125 controls output of output information corresponding to the answer "the door can be fixed". For example, the output control unit 125 may generate output information "I hear that the door can be fixed" by the modification of adding "I hear that" to the beginning of the answer "the door can be fixed" (S113). Alternatively, the output control unit 125 may generate output information by performing another modification on the answer "the door can be fixed", or may directly use the answer "the door can be fixed" as the output information.

Note that, here, it is also assumed that the output information includes voice information (e.g. voice information obtained by reading out text data, etc.), and the output control unit 125 controls the sound output unit 111 such that the voice information is output by the sound output unit 111. Nevertheless, the output information needs not include voice information. For example, the output information may include display information (e.g. character string corresponding to text data, etc.), and the output control unit 125 may control the display unit 150 such that the display information is output by the display unit 150.

Upon receiving the output information corresponding to the answer "the door can be fixed", the user U considers that he or she desires to know the cost of door repair, and inputs input information indicating "how much?" for inquiring about the cost of door repair (S114). From the input information, the text data analysis unit 122 can detect a demand from the user U "desire to know price". For example, it is assumed that a combination of a question "how much?" and a demand "desire to know price" is pre-registered in the database. In this case, the text data analysis unit 122 is only required to detect the demand from the user U "desire to know price", by acquiring the demand "desire to know price" corresponding to the input information "how much?".

Upon receiving the input information, the output control unit 125 outputs output information indicating that "ask directly" that corresponds the input information (S115). Upon receiving the output information, the user U inputs input information "I see" indicating the agreement to directly inquiring of the repair company about the cost of door repair (S116). Subsequently, the output control unit 125 controls output of a change in a conversation partner of the user U from the information processing device 10 to the answerer of the repair company, and controls output of pre-transmission of the problem that the user U has "a door has broken down" and the demand of the user U "desire to know price", to the information processing device 30 (S117).

Upon receiving the output information, in a case where the user U agrees to the change in the conversation partner (connection to the information processing device 30) and the pre-transmission of the problem and the demand, the user U inputs input information indicating the agreement (indicating that connection is to be performed) (e.g. by pressing an "agree button B1", or by emitting a voice "yes" indicating agreement). On the other hand, upon receiving the output information, in a case where the user U does not agree to either one of the change in the conversation partner and the pre-transmission of the problem and the demand, the user U inputs input information indicating the refusal (e.g. by pressing a "refuse button B2", or by emitting voice "no" indicating refusal).

In a case where the input information indicating the agreement (indicating that connection is to be performed) is input by the user U, the transmission control unit 124 controls the pre-transmission of the problem and the demand to the information processing device 30. The connection control unit 123 generates identification information (hereinafter, also referred to as a "project ID") (S174). The project ID is generated so as to be uniquely allocated to a problem that the user U has. Then, using the project ID, the connection control unit 123 controls connection to the information processing device 30 (S175). By the control, the information processing device 10 and the information processing device 30 are connected.

Note that, FIG. 5 illustrates an example in which the information processing device 10 and the information processing device 30 are connected after the conversation between the user U and the information processing device 10 (S112 to S118), the transmission of the problem to the repair company (S151), the reception of the answer from the repair company (S152), and the pre-transmission of the problem and the demand to the information processing device 30 are performed. Nevertheless, these operations are not essential to the connection between the information processing device 10 and the information processing device 30, and may be appropriately omitted.

More specifically, as described above, in a case where a problem that the user U has is detected, the connection control unit 123 may control connection to the information processing device 30 using the project ID, without obtaining an answer indicating that the problem that the user U has can be solved. Alternatively, in a case where a problem that the user U has is detected, and in a case where the execution of connection is input from the user U, the connection control unit 123 may control the connection to the information processing device 30 using the project ID, without obtaining an answer indicating that the problem that the user U has can be solved.

When the information processing device 10 and the information processing device 30 are connected, relay of a sound is started by the information processing device 10 (S176). In other words, while the information processing device 10 is connected to the information processing device 30, the output control unit 125 controls output of acquisition information (input information input by the answerer T) acquired from the information processing device 30. In addition, while the information processing device 10 is connected to the information processing device 30, the transmission control unit 124 controls the transmission of the input information input by the user U, to the information processing device 30.

Note that, in the present specification, it is mainly assumed that the acquisition information acquired from the information processing device 30 and the input information input by the user U include voice information (assumed that the acquisition information and the input information are input using voice). Nevertheless, the acquisition information and the input information may include images. More specifically, a conversation may be performed between the answerer T and the user U using gesture of the answerer T, and an image of the user U that has been captured by the imaging unit 114. Alternatively, a conversation may be performed between the answerer T and the user U using text data input by the answerer T, and text data input by the user U.

Specifically, when the information processing device 10 and the information processing device 30 are connected, the answerer T inputs input information indicating the first greeting "Hello, this is a repair company" (S121). When the input information is acquired from the information processing device 30 as acquisition information, the output control unit 125 controls output of the acquisition information. Upon receiving the acquisition information, the user U inputs the first greeting "Hello" as input information (S122). The transmission control unit 124 controls the transmission of the input information input by the user U, to the information processing device 30.

Upon receiving the input information, the answerer T refers to the demand of the user U "desire to know price" that has been obtained by the pre-transmission, and inputs input information "you want to know the price of door repair, right?" for confirming the demand of the user U (S123). When the input information is acquired from the information processing device 30 as acquisition information, the output control unit 125 controls output of the acquisition information. Upon receiving the acquisition information, the user U inputs agreement "yes, how much?" as input information (S124). The transmission control unit 124 controls the transmission of the input information input by the user U, to the information processing device 30.

Upon receiving the input information, the answerer T input an answer to the cost required for door repair "it costs 5000 yen including tax." (S125). When the input information is acquired from the information processing device 30 as acquisition information, the output control unit 125 controls output of the acquisition information. Upon receiving the acquisition information, the user U inputs a request for door repair "I see. I will consider it.", as input information (S126). The transmission control unit 124 controls the transmission of the input information input by the user U, to the information processing device 30.

Upon receiving the input information, the answerer T inputs an answer "thank you." indicating the acceptance of the request for door repair (S127). When the input information is acquired from the information processing device 30 as acquisition information, the output control unit 125 controls output of the acquisition information. Upon receiving the acquisition information, the user U ends the connection between the information processing device 10 and the information processing device 30. In a case where the connection has ended, the connection control unit 123 deletes the project ID (invalidates the project ID) (S128, S177).

It is assumed that the answerer T of the repair company tries to make contact with the user U after the connection between the information processing device 10 and the information processing device 30 has ended, and a time has elapsed. Nevertheless, because the project ID has been already invalidated, the information processing device 30 can no longer connect to the information processing device 10 using the project ID. In other words, in a case where a connection demand is issued from the information processing device 30 using the project ID after the project ID has been invalidated, the connection control unit 123 refuses connection with the information processing device 30. Thus, the answerer T of the repair company can no longer make contact with the user U, and says that "contact cannot be made from us" (S129).

As described above, in a case where a problem that the user U has is detected, the information processing device 10 connects to the information processing device 30 using a project ID. While the connection is established between the information processing device 10 and the information processing device 30, the information processing device 10 can transmit input information input by the user U, to the information processing device 30, and receive input information input from the answerer, as acquisition information. Then, in a case where the connection has ended, the information processing device 10 invalidates the project ID.

According to this configuration, because the project ID is invalidated in a case where the connection has ended between the information processing device 10 and the information processing device 30, the information processing device 30 can no longer connect to the information processing device 10 using the project ID. In other words, after the problem that the user U has is solved, the user U can avoid making contact with the answerer T. It therefore becomes possible for the user U to easily make direct contact with the answerer T.

[1.4. Hardware Configuration Example]

Figure 8:
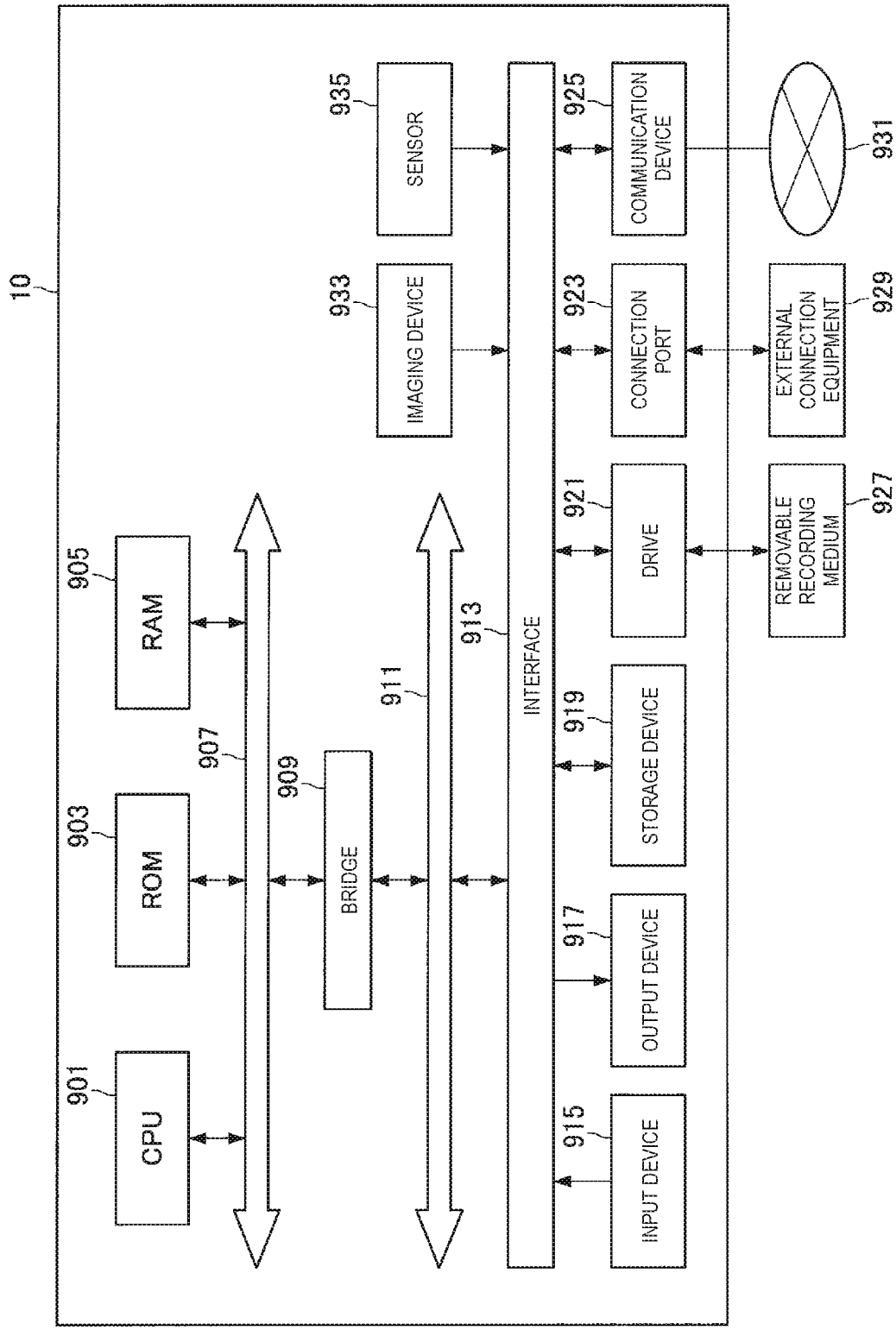
FIG. 8 is a block diagram illustrating a hardware configuration example of the information processing device.

Next, with reference to FIG. 8, a hardware configuration of the information processing device 10 according to the embodiment of the present disclosure will be described. FIG. 8 is a block diagram illustrating the hardware configuration example of the information processing device 10 according to the embodiment of the present disclosure.

As illustrated in FIG. 8, the information processing device 10 includes a central processing unit (CPU) 901, read only memory (ROM) 903, and random access memory (RAM) 905. In addition, the information processing device 10 may include a host bus 907, a bridge 909, an external bus 911, an interface 913, an input device 915, an output device 917, a storage device 919, a drive 921, a connection port 923, and a communication device 925. Moreover, the information processing device 10 may include an imaging device 933 and a sensor 935, as necessary. The information processing device 10 may include a processing circuit such as a digital signal processor (DSP) or an application specific integrated circuit (ASIC), alternatively or in addition to the CPU 901.

The CPU 901 serves as an arithmetic processing device and a control device, and controls the overall operation or a part of the operation of the information processing device 10 according to various programs recorded in the ROM 903, the RAM 905, the storage device 919, or a removable recording medium 927. The ROM 903 stores programs, operation parameters, and the like used by the CPU 901. The RAM 905 temporarily stores programs used when the CPU 901 is executed, and parameters that change as appropriate when executing such programs. The CPU 901, the ROM 903, and the RAM 905 are connected with each other via the host bus 907 configured from an internal bus such as a CPU bus. In addition, the host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the information processing device 10. The input device 915 includes an input control circuit that generates input signals on the basis of information which is input by a user to output the generated input signals to the CPU 901. A user inputs various types of data and indicates a processing operation to the information processing device 10 by operating the input device 915. In addition, the imaging device 933 (to be described later) may function as the input device by capturing an image of movement of hands of a user or capturing a finger of a user. In this case, a pointing position may be decided in accordance with the movement of the hands or a direction of the finger.

The output device 917 includes a device that can visually or audibly report acquired information to a user. The output device 917 may be, for example, a display device such as a liquid crystal display (LCD), a plasma display panel (PDP), an organic electro-luminescence (EL) display, a projector, or a hologram display device, an audio output device such as a speaker or a headphone, or a printer. The output device 917 outputs a result obtained through a process performed by the information processing device 10, in the form of text or video such as an image, or sounds such as voice and audio sounds. In addition, the output device 917 may include a light or the like to light the surroundings.

The storage device 919 is a device for data storage that is an example of the storage unit of the information processing device 10. The storage device 919 includes, for example, a magnetic storage unit device such as a hard disk drive (HDD), a semiconductor storage device, an optical storage device, or a magneto-optical storage device. The storage device 919 stores therein various data and programs executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the information processing device 10. The drive 921 reads out information recorded on the mounted removable recording medium 927, and outputs the information to the RAM 905. The drive 921 writes the record into the mounted removable recording medium 927.

The connection port 923 is a port used to directly connect equipment to the information processing device 10. The connection port 923 may be a USB (Universal Serial Bus) port, an IEEE1394 port, and a Small Computer System Interface (SCSI) port, or the like. In addition, the connection port 923 may be an RS-232C port, an optical audio terminal, an HDMI (registered trademark) (High-Definition Multimedia Interface) port, and so on. The connection of the external connection equipment 929 to the connection port 923 makes it possible to exchange various kinds of data between the information processing device 10 and the external connection equipment 929.

The communication device 925 is a communication interface including, for example, a communication device for connection to the communication network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transmits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio communication, or satellite communication.

The imaging device 933 is a device that captures images of a real space by using an image sensor such as a charge coupled device (CCD) or a complementary metal oxide semiconductor (CMOS), and various members such as a lens for controlling image formation of a subject image onto the image sensor, and generates the captured images. The imaging device 933 may capture a still image or a moving image.

The sensor 935 is various sensors such as a ranging sensor, an acceleration sensor, a gyro sensor, a geomagnetic sensor, an optical sensor, and a sound sensor. The sensor 935 acquires information regarding a state of the information processing device 10 such as a posture of a housing of the information processing device 10, and information regarding an environment surrounding the information processing device 10 such as luminous intensity and noise around the information processing device 10. The sensor 935 may include a global positioning system (GPS) sensor that receives GPS signals to measure latitude, longitude, and altitude of the device.

2. Conclusion

As described above, according to the embodiment of the present disclosure, there is provided the information processing device 10 including the connection control unit 123 that controls, in a case where information regarding a situation of a user is detected, connection to another information processing device using a project ID corresponding to the situation of the user, the output control unit 125 that controls output of acquisition information acquired from the other information processing device, while the information processing device 10 is connected to the other information processing device, and the transmission control unit 124 that controls transmission of input information input by the user, to the other information processing device, while the information processing device 10 is connected to the other information processing device, and in the information processing device 10, the connection control unit 123 invalidates the project ID in a case where the connection has ended.

According to this configuration, because the project ID is invalided in a case where the connection has ended between the information processing device 10 and the information processing device 30, the information processing device 30 can no longer connect to the information processing device 10 using the project ID. In other words, after the problem that the user U has is solved, the user U can avoid making contact with the answerer T. It therefore becomes possible for the user U to easily make direct contact with the answerer T.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above description has been given of an example in which the connection control unit 123 invalidates the project ID in a case where the connection between the information processing device 10 and the information processing device 30 has ended. Nevertheless, a condition for invalidating the project ID is not limited to the end of the connection between the information processing device 10 and the information processing device 30. In other words, the connection control unit 123 is only required to invalidate the project ID in a case where a predetermined condition is satisfied. As the predetermined condition, various conditions are assumed as described below.

For example, the predetermined condition may be such a condition that improvement in a problem of the user U is detected by image recognition performed on an image captured by the imaging unit 114. The improvement in the problem may be detected in any specific manner. For example, in a case where the problem of the user U includes information regarding failures of goods or facilities, the improvement in the problem may be detected on the basis of a status of repair of the goods or facilities that is recognized from the image. Alternatively, in a case where the problem of the user U includes information regarding failures of goods or facilities, the improvement in the problem may be detected on the basis of states of the goods or facilities that are recognized from the image.

In addition, for example, in a case where the problem of the user U includes information regarding a failure of an electronic device having a communication function, the predetermined condition may be such a condition that a communication state of the electronic device is detected to be normal. Alternatively, the predetermined condition may be such a condition that a predetermined time has elapsed since the connection between the information processing device 10 and the information processing device 30 had been started. The predetermined time may be arbitrarily-settable by the user U. In addition, the predetermined condition may be such a condition that an invalidation instruction of the project ID is input by the user U.

In a case where the predetermined condition is a condition of input of an invalidation instruction, the output control unit 125 may control output of output information asking the user U whether to invalidate the project ID, before the input of the invalidation instruction. Note that, the output information may include voice information (e.g. voice information obtained by reading out text data, etc.), and the output control unit 125 may control the sound output unit 111 such that the voice information is output by the sound output unit 111. Alternatively, the output information needs not include the voice information. For example, the output information may include display information (e.g. character string corresponding to text data, etc.), and the output control unit 125 may control the display unit 150 such that the display information is output by the display unit 150.

Figure 9:
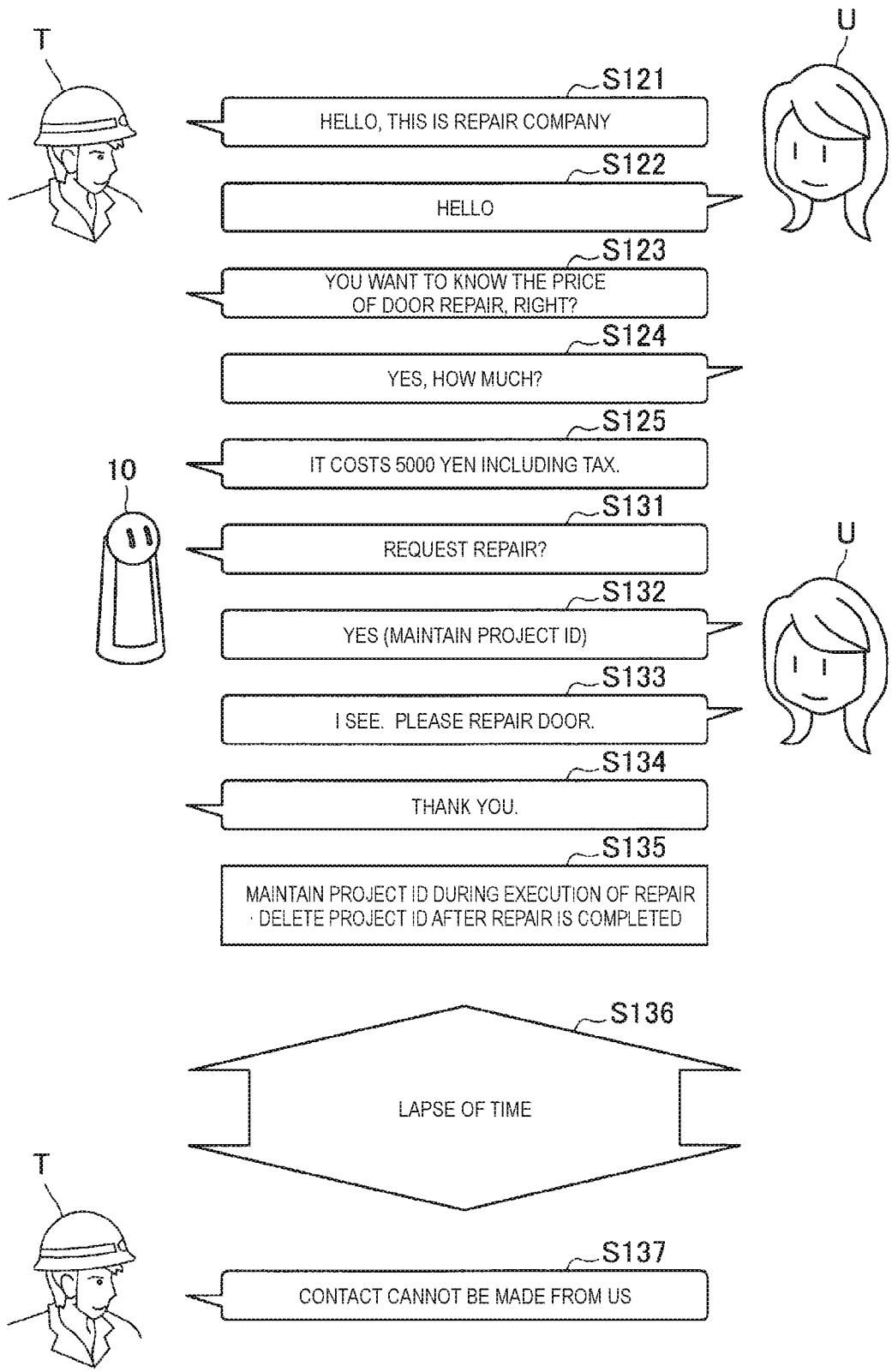
FIG. 9 is a diagram illustrating another example of a flow of a conversation performed between the user and the answerer.

The case where the predetermined condition is a condition of input of an invalidation instruction will be specifically described. Also in this case, a conversation performed between the information processing device 10 and the user U can be performed as illustrated in FIG. 5. In addition, FIG. 9 is a diagram illustrating another example of a flow of a conversation performed between the user U and the answerer T. The description will be given below with reference to FIGS. 7 and 9. S121 to S125 illustrated in FIG. 9 can also be performed similarly to S121 to S125 illustrated in FIG. 6.

Upon receiving the input information, the answerer T input an answer to the cost required for door repair "it costs 5000 yen including tax." (S125). When the input information is acquired from the information processing device 30 as acquisition information, the output control unit 125 controls output of the acquisition information. The output control unit 125 outputs output information indicating "request repair?" that corresponds to the acquisition information "it costs 5000 yen including tax." (S131). Upon receiving the output information, the user U inputs input information "yes" indicating the agreement to requesting the repair company to perform repair (S132). At this time, the project ID is maintained (not invalidated). The user U inputs a request for door repair "I see. Please repair the door.", as input information (S133). The transmission control unit 124 controls the transmission of the input information input by the user U, to the information processing device 30.

Upon receiving the input information, the answerer T inputs an answer "thank you." indicating the acceptance of the request for door repair (S134). When the input information is acquired from the information processing device 30 as acquisition information, the output control unit 125 controls output of the acquisition information. Upon receiving the acquisition information, the user U ends the connection between the information processing device 10 and the information processing device 30. Even if the connection ends, the project ID is maintained. Then, the project ID is also maintained while the repair is being executed by the repair company, and when the repair is completed by the repair company, and input of the invalidation instruction is issued by the user U, the connection control unit 123 deletes (invalidates) the project ID (S135, S177).

It is assumed that the answerer T of the repair company tries to make contact with the user U after the project ID has been deleted (invalidated), and a time has elapsed. Nevertheless, because the project ID has been already invalidated, the information processing device 30 can no longer connect to the information processing device 10 using the project ID. In other words, in a case where a connection demand is issued from the information processing device 30 using the project ID after the project ID has been invalidated, the connection control unit 123 refuses connection with the information processing device 30. Thus, the answerer T of the repair company can no longer make contact with the user U, and says that "contact cannot be made from us" (S137). The project ID can also be deleted (invalidated) in the above-described manner.

In addition, in a case where output of output information asking whether to invalidate the project ID is controlled by the output control unit 125, the user U can also input maintenance of the project ID (hereinafter, also referred to as a "validation instruction".). In a case where a validation instruction of the project ID is input, the connection control unit 123 may maintain the project ID for allowing connection with the information processing device 30. Then, the transmission control unit 124 may control the transmission of allowance of connection, to the information processing device 30. At this time, by registering information regarding an operator (e.g. name of an operator, etc.) in association with the project ID, the connection control unit 123 may facilitate the connection to the operator that is performed using the project ID, from the information regarding the operator. In addition, the connection control unit 123 may create a contact information icon of the operator on the basis of the registration of the information regarding the operator.

At this time, the connection control unit 123 may make the project ID arbitrarily-deletable by the invalidation instruction issued by the user U, and the transmission control unit 124 may control the transmission of connection being arbitrarily-refusable by the user U, to the information processing device 30. The generation and deletion of an e-mail address, a telephone number, and the like are not easy, but the generation and deletion of the project ID can be easily performed. Thus, by using the project ID, it is possible to easily block contact from an operator. This can easily prevent an undesired approach from an operator, or the like. Particularly in a case where a connection partner is an operator that provides a network service, or the like, because an address of the user U can be prevented from being known by the operator, it is effective to delete the project ID for maintaining the privacy of the user U.

In addition, even in a case where the project ID is deleted (even in a case where the project ID is invalidated), the connection control unit 123 may record a history of conversations with an operator (e.g. information regarding conversations with the answerer T, etc.) independently of the project ID. Particularly in a case where a connection partner is an operator that provides a network service, or the like, because there is possibility that information regarding the operator is not left on the user side, due to the deletion of the project ID, it is effective to record the history of conversations with the operator for maintaining the privacy of the user U. This enables the user U to easily think back content of a request to the operator, by referring to the history of conversations with the operator, for example. In a case where it becomes necessary to make contact with the operator again, the contact can be made by newly issuing a project ID.

In addition, for causing the user U to easily recognize with whom the user U is performing a conversation, the output control unit 125 may control display of an image related to the information processing device 30 being a connection partner. For example, in a case where connection is established with the information processing device 30 in chatting, the output control unit 125 may control display of an icon of a user of the information processing device 30 (or an organization (company, etc.) to which the user belongs), or a head shot of the user of the information processing device 30. In a similar manner, in a case where telephone connection is established with the information processing device 30, the output control unit 125 may control display of an icon of the user of the information processing device 30 (or an organization (company, etc.) to which the user belongs), or a head shot of the user of the information processing device 30.

Here, an image to be displayed may be an image acquired via the Internet (e.g. a logo of a company, a profile image in SNS, etc.). In addition, a timing at which the image is displayed is not specifically limited. For example, the output control unit 125 may control display of an image related to the information processing device 30, while the information processing device 10 is connected with the information processing device 30, or may control display of an image related to the information processing device 30, in a case where the information processing device 10 tries to connect with the information processing device 30. The display of the image may be performed by the projector (the display unit 150) included in the information processing device 10, may be performed by a display provided on a main body of the information processing device 10, or may be performed by an external display device (control target equipment 20) that the information processing device 10 can control.

In addition, the positions of the respective structural elements are not specifically limited as long as the above-described operation of the information processing device 10 is achieved. As a specific example, the text data generation unit 121, the text data analysis unit 122, and the like may be provided in a server (not illustrated) connected via a communication network 931. In other words, the information processing device 10 may be implemented by using so-called cloud computing. In this case, the information processing device 10 corresponds to a client connected with the server via the communication network 931. The text data generation unit 121, the text data analysis unit 122, and the like may be installed in different servers.

Alternatively, one of the text data generation unit 121 and the text data analysis unit 122 may be installed in the server (not illustrated), and the other of the text data generation unit 121 and the text data analysis unit 122 may be installed in hardware of the client. Alternatively, the information processing device 10 may be implemented by the text data generation unit 121 and the text data analysis unit 122 that are installed in the server (not illustrated), and the information processing device 10 does not have to include the other structural elements.

In addition, it is also possible to create a computer program for causing hardware such as CPU, ROM, and RAM, which are embedded in a computer, to execute functions equivalent to the functions of the control unit 120. Moreover, it may be possible to provide a computer-readable recording medium having the program recorded thereon.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a connection control unit configured, in a case where information regarding a situation of a user is detected, to control connection to another information processing device by using identification information;

an output control unit configured to control output of acquisition information acquired from the other information processing device, while the information processing device is connected to the other information processing device; and a transmission control unit configured to control transmission of input information input by the user, to the other information processing device, while the information processing device is connected to the other information processing device, in which, in a case where a predetermined condition is satisfied, the connection control unit invalidates the identification information.

(2)

The information processing device according to (1), in which, in a case where a connection demand is issued from the other information processing device by using the identification information after the identification information has been invalidated, the connection control unit refuses connection to the other information processing device.

(3)

The information processing device according to (1) or (2), in which, in a case where information regarding a situation of the user is detected, and in a case where execution of the connection is input from the user, the connection control unit controls connection to the other information processing device by using the identification information.

(4)

The information processing device according to any one of (1) to (3), in which, in a case where information regarding a situation of the user is detected, the transmission control unit controls transmission of the information regarding the situation of the user, to the other information processing device.

(5)
The information processing device according to (4), in which, in a case where an answer indicating that the situation of the user can be changed is acquired, the connection control unit controls connection to the other information processing device by using the identification information.
(6)
The information processing device according to any one of (1) to (5), where in which in the acquisition information includes first voice information, and
the output control unit controls output of the first voice information.
(7)
The information processing device according to any one of (1) to (6), in which the input information includes second voice information, and
the transmission control unit controls transmission of the second voice information to the other information processing device.
(8)
The information processing device according to any one of (1) to (7), including
a text data analysis unit configured to detect information regarding a situation of the user, by analyzing text data obtained by a speech recognition process that is based on collected sound information.
(9)
The information processing device according to (8), including
a text data generation unit configured to generate the text data by the speech recognition process that is based on the sound information.
(10)
The information processing device according to any one of (1) to (9), including
a data acquisition unit configured to acquire an answer to information regarding a situation of the user, via a communication unit.
(11)
The information processing device according to any one of (1) to (10), in which the output control unit controls display of an image related to the other information processing device.
(12)
The information processing device according to (11), in which the image related to the other information processing device includes an icon of a user of the other information processing device, an icon of an organization to which the user belongs, or a head shot of the user.
(13)
The information processing device according to (11) or (12), in which the output control unit controls display of the image related to the other information processing device, while the information processing device is connected to the other information processing device, or in a case where the information processing device tries to connect to the other information processing device.
(14)
The information processing device according to any one of (1) to (13), in which the predetermined condition includes at least any one of a condition that the connection has ended, a condition that improvement in a problem of the user is detected by image recognition performed on a captured image, a condition that a communication state of an electronic device that had a failure is detected to be normal, and a condition that a predetermined time has elapsed since connection to the other information processing device had been started.
(15)
The information processing device according to any one of (1) to (14), in which the predetermined condition includes a condition that an invalidation instruction of the identification information is input by the user.
(16)
The information processing device according to (15), in which the output control unit controls output of output information asking the user whether to invalidate the identification information.
(17)
The information processing device according to (16), in which, in a case where a validation instruction of the identification information is input, the connection control unit maintains the identification information.
(18)
The information processing device according to (17), in which, in a case where a validation instruction of the identification information is input, the transmission control unit maintains the identification information, and controls transmission of allowance of connection, to the other information processing device.
(19)
An information processing method including:
controlling, by a processor, connection to another information processing device by using identification information, in a case where information regarding the situation of the user is detected;
controlling output of acquisition information acquired from the other information processing device, while being connected to the other information processing device; and
controlling transmission of input information input by the user, to the other information processing device, while being connected to the other information processing device,
in which, in a case where a predetermined condition is satisfied, the identification information is invalidated by a processor.
(20)
A program for causing a computer to function as an information processing device including:
a connection control unit configured, in a case where information regarding a situation of a user is detected, to control connection to another information processing device by using identification information;
an output control unit configured to control output of acquisition information acquired from the other information processing device, while the information processing device is connected to the other information processing device; and
a transmission control unit configured to control transmission of input information input by the user, to the other information processing device, while the information processing device is connected to the other information processing device,
in which, in a case where a predetermined condition is satisfied, the connection control unit invalidates the identification information.

REFERENCE SIGNS LIST 10 information processing device
111 sound output unit
113 sound collection unit
114 imaging unit
115 distance detection unit 120 control unit
121 text data generation unit
122 text data analysis unit
123 connection control unit
124 transmission control unit
125 output control unit
126 data acquisition unit
130 storage unit
140 communication unit
150 display unit
20 control target equipment
230 storage unit
30 information processing device

The invention claimed is:

1. A first information processing device, comprising:
   a connection control unit configured to:
      control connection with a second information processing device based on identification information, wherein the identification information corresponds to information regarding a situation of a user of the first information processing device; and
      invalidate the identification information based on a specific condition, wherein the invalidation of the identification information corresponds to deletion of the identification information;
   an output control unit configured to control output of acquisition information acquired from the second information processing device, based on the connection with the second information processing device; and
   a transmission control unit configured to control transmission of input information to the second information processing device based on the connection with the second information processing device, wherein the input information is input by the user.

2. The first information processing device according to claim 1, wherein
   the connection control unit is further configured to refuse connection to the second information processing device based on a connection demand issued from the second information processing device, and
   the connection demand is based on the identification information after the identification information is invalidated.

3. The first information processing device according to claim 1, wherein the connection control unit is further configured to control the connection with the second information processing device based on the identification information, when execution of the connection with the second information processing device is input from the user.

4. The first information processing device according to claim 1, wherein, when the information regarding the situation of the user is detected, the transmission control unit is further configured to control transmission of the information regarding the situation of the user to the second information processing device.

5. The first information processing device according to claim 4, wherein
   the connection control unit is further configured to control the connection with the second information processing device based on the identification information and acquisition of an answer, and
   the answer indicates that the situation of the user is changeable.

6. The first information processing device according to claim 1, wherein
   the acquisition information includes voice information, and
   the output control unit is further configured to control output of the voice information.

7. The first information processing device according to claim 1, wherein
   the input information includes voice information, and
   the transmission control unit is further configured to control transmission of the voice information to the second information processing device.

8. The first information processing device according to claim 1, further comprising a text data analysis unit configured to detect the information regarding the situation of the user based on analysis of text data, wherein
   the text data is generated based on a speech recognition process, and
   the speech recognition process is based on collected sound information.

9. The first information processing device according to claim 8, further comprising a text data generation unit configured to generate the text data based on the speech recognition process.

10. The first information processing device according to claim 1, further comprising a data acquisition unit configured to acquire an answer to the information regarding the situation of the user, via a communication unit.

11. The first information processing device according to claim 1, wherein the output control unit is further configured to control display of an image associated with the second information processing device.

12. The first information processing device according to claim 11, wherein the image includes one of an icon of a user of the second information processing device, an icon of an organization to which the user of the second information processing device belongs, or a head shot of the user of the second information processing device.

13. The first information processing device according to claim 11, wherein the output control unit is further configured to control the display of the image when one of the first information processing device is connected to the second information processing device, or the first information processing device tries to connect to the second information processing device.

14. The first information processing device according to claim 1, wherein the specific condition includes at least one of a condition that the connection with the second information processing device has ended, a condition that indicates detection of an improvement in a problem of the user based on image recognition process, a condition that a communication state of an electronic device that had a failure is detected to be normal, or a condition that indicates elapse of a specific time of the connection with the second information processing device.

15. The first information processing device according to claim 1, wherein the specific condition includes a condition that an invalidation instruction of the identification information is input by the user.

16. The first information processing device according to claim 15, wherein
   the output control unit is further configured to control output of output information,
   the output information is associated with determination of the invalidation of the identification information, and
   the determination of the invalidation is based on an input from the user.

17. The first information processing device according to claim 16, wherein the connection control unit is further configured to maintain the identification information based on a validation instruction of the identification information, and the validation instruction is based on the input from the user.

18. The first information processing device according to claim 17, wherein, when the validation instruction of the identification information is input, the transmission control unit is further configured to maintain the identification information, and control transmission of allowance of the connection with the second information processing device.

19. An information processing method, comprising:
controlling connection with an information processing device based on identification information, wherein the identification information corresponds to information regarding a situation of a user;
controlling output of acquisition information acquired from the information processing device based on the connection with the information processing device;
controlling transmission of input information to the information processing device, based on the connection with the information processing device, wherein the input information is input by the user; and
invalidating the identification information based on a specific condition, wherein the invalidation of the identification information corresponds to deletion of the identification information.

20. A non-transitory computer-readable medium having stored thereon computer-executable instructions which, when executed by a processor, cause the processor to execute operations, the operations comprising:
controlling connection with an information processing device based on identification information, wherein the identification information corresponds to information regarding a situation of a user;
controlling output of acquisition information acquired from the information processing device based on the connection with the information processing device;
controlling transmission of input information to the information processing device, based on the connection with the information processing device, wherein the input information is input by the user; and
invalidating the identification information based on a specific condition, wherein the invalidation of the identification information corresponds to deletion of the identification information.

* * * * *